United States Patent
Linnartz

(10) Patent No.: US 9,941,981 B2
(45) Date of Patent: Apr. 10, 2018

(54) BODY COUPLED COMMUNICATION DEVICE

(71) Applicant: KONINKLIJKE PHILIPS N.V., Eindhoven (NL)

(72) Inventor: Johan-Paul Marie Gerard Linnartz, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/317,148

(22) PCT Filed: Jun. 18, 2015

(86) PCT No.: PCT/EP2015/063770
§ 371 (c)(1),
(2) Date: Dec. 8, 2016

(87) PCT Pub. No.: WO2015/193460
PCT Pub. Date: Dec. 23, 2015

(65) Prior Publication Data
US 2017/0117973 A1 Apr. 27, 2017

(30) Foreign Application Priority Data
Jun. 18, 2014 (EP) .................................. 14172885

(51) Int. Cl.
*H04B 5/00* (2006.01)
*H04B 13/00* (2006.01)

(52) U.S. Cl.
CPC ......... *H04B 13/005* (2013.01); *H04B 5/0012* (2013.01); *H04B 5/0075* (2013.01)

(58) Field of Classification Search
None
See application file for complete search history.

(56) References Cited

U.S. PATENT DOCUMENTS

| | | | |
|---|---|---|---|
| 6,211,799 B1 | 4/2001 | Post | |
| 7,907,057 B2 | 3/2011 | Schaffler | |

(Continued)

FOREIGN PATENT DOCUMENTS

| | | |
|---|---|---|
| EP | 2413521 A1 | 2/2012 |
| JP | 2009213062 A | 9/2009 |

(Continued)

OTHER PUBLICATIONS

Schenk Tim C. et al., "Experimental Characterization of the Body-Coupled Communications Channel", Wireless Communication Systems, 2008, ISWCS '08. IEEE International Symposium on Oct. 21-24, 2008, pp. 233-239.

(Continued)

*Primary Examiner* — Mohammed Rachedine
(74) *Attorney, Agent, or Firm* — Larry Liberchuk

(57) ABSTRACT

Body coupled communication device (200; 201) arranged to receive signals via a body transmission channel (260), the device (200) comprising —two couplers (202, 204) arranged to receive a body-coupled signal from the body transmission channel (260), the body transmission channel (260) being formed by a body of a user (150) when the body is in the direct vicinity of the couplers (202, 204), —a receiver amplifier (206) coupled to at least one of the two couplers, —an inductance (220) for matching the impedance of the receiver amplifier, the inductance being arranged in parallel to the couplers.

7 Claims, 4 Drawing Sheets

(56) References Cited

U.S. PATENT DOCUMENTS

| | | | |
|---|---|---|---|
| 8,301,084 B2 | 10/2012 | Gorbachov | |
| 8,374,700 B2 | 2/2013 | Haubrich | |
| 2006/0252371 A1 | 11/2006 | Yanagida | |
| 2011/0021141 A1 | 1/2011 | Hebiguchi | |
| 2011/0294421 A1 | 12/2011 | Hebiguchi | |
| 2012/0218218 A1* | 8/2012 | Kauko | G06F 3/0416 345/174 |
| 2015/0230707 A1* | 8/2015 | Anderson | A61B 5/0028 600/364 |

FOREIGN PATENT DOCUMENTS

| | | |
|---|---|---|
| WO | WO2006040095 A2 | 4/2006 |
| WO | WO2010119849 A1 | 10/2010 |

OTHER PUBLICATIONS

Namjun Cho et al., "The Human Body Characteristics as a Signal Transmission Medium for Intrabody Communication", IEEE Transactions on Microwave Theory and Techniques, vol. 55, No. 5, pp. 1080-1086, May 2007.

Song Seong-Jun et al., "A 0.9V 2.6mW Body-Coupled Scalable PHY Transceiver for Body Sensor Applications," ISSCC Digest of Technical Papers, pp. 366-367, Feb. 2007, 2007 IEEE International Solid-State Circuits Conference.

Ruiz Jordi Agud et al., "Statistical Modeling of Intra-body Propagation Channel", IEEE Communications Society, Wireless Communications and Networking Conference, 2007, pp. 2065-2070, WCNC 2007. IEEE Mar. 11-15, 2007.

Cho Namjun et al., "A 60kb/s-to-10Mb/s 0.37nJ/b Adaptive-Frequency-Hopping Transceiver for Body-Area Network", ISSCC Digest of Technical Papers, pp. 132-133, Feb. 2008, 2008 IEEE International Solid-State Circuits Conference.

Mazloum Nafiseh Seyed et al., "Body-Coupled Communications Experimental Characterization, Channel Modeling and Physical Layer Design", Master Thesis, Chalmers University of Technology Philips Research, Department of Signals and Systems Distributed Sensor Systems, Dec. 2008.

Jonassen Niels et al., "Human Body Capacitance: Static or Dynamic Concept?", Electrical Overstress/Electrostatic Discharge Symposium Proceedings, pp. 111-117, Oct. 6, 1998-Oct. 8, 1998, Reno, NV, USA.

Haga Nozomi et al., "Proper Derivation of Equivalent-Circuit Expressions of Intra-Body Communication Channels Using Quasi-Static Field", IEICE Transactions on Communications, vol. E95B, (1), pp. 51-59, Jan. 2012.

Ku Rouyu et al., "Equation Environment Coupling and Interference on the Electric-Field Intrabody Communication Channel", IEEE Transactions on Biomedical Engineering, vol. 59, No. 7, pp. 2051-2059, Jul. 2012.

Shinagawa Mitsuru et al., "Near-Field-Sensing Transceiver for Intrabody Communication Based on the Electrooptic Effect", IEEE Transactions on Instrumentation and Measurement, vol. 53, No. 6, pp. 1533-1538, Dec. 2004.

Choi Sungdae et al., "A 24.2-µW Dual-Mode Human Body Communication Controller for Body Sensor Network", 2006 Proceedings of the 32nd European Solid-State Circuits Conference, pp. 227-230, 2006.

Song Seong-Jun et al., "A 2Mb/s Wideband Pulse Transceiver with Direct-Coupled Interface for Human Body Communications", 2006 IEEE International Solid-State Circuits Conference, ISSCC Digest of Technical Papers, Session 30 / Silicon for Biology / 30.4, pp. 558-559.

Fazzi Alberto et al., "A 2.75mW Wideband Correlation-Based Transceiver for Body-Coupled Communication", Proceedings of the IEEE International Solid-State Circuits Conference 2009, ISSCC 2009/SESSION 11/TD: Trends in Wireless Communications/11.5.

Bae Joonsung et al., "An Energy-Efficient Body Channel Communication based on Maxwell's Equations Analysis of On-Body Transmission Mechanism", Medical Information and Communication Technology (ISMICT), 2012 6th International Symposium, Mar. 25-29, 2012.

"Integrated Transceiver Modules for ZigBee / 802.15.4 (2.4 GHz)", ProFLEX01 Transceiver Module, Datasheet, LS Research, LLC, pp. 1-35, 2009-2012.

\* cited by examiner

BODY COUPLED COMMUNICATION DEVICE

FIELD OF THE INVENTION

The invention relates to a body coupled communication device arranged to receive signals via a body transmission channel.

BACKGROUND

Body-coupled communications (BCC) or body-based communication has been proposed as a promising alternative to radio frequency (RF) communication for instance as a basis for body area networks (BANs); An example is the standard by the 802.15.6 Task Group of the Institute of Electrical and Electronics Engineers (IEEE). BCC allows exchange of information between a plurality of devices which are at or in close proximity of a body of a human or an animal. This can be achieved by capacitive or galvanic coupling of low-energy electric fields onto the body surface.

In capacitive body coupled communication (BCC) systems information is transmitted from a transmission device to a receiver device via capacitive coupled signals over the user body. Body coupled communication utilizes an electric field rather than an electromagnetic field to transmit information. Capacitive coupling the signal from a small body-worn tag into your body, it generates a minute yet detectable electric field that extends outwardly a couple of centimeters from the entire surface of your skin.

Body coupled communication (BCC) uses the human body as communication channel. It enables wireless communication over a human body between devices that are in contact with that human body. Signals are conveyed over the body instead of through the air. As such, the communication is confined to an area close to the body in contrast to RF communications, where a much larger area is covered. Therefore, communication is possible between devices situated on, connected to, or placed close to the body. Moreover, since lower frequencies can be applied then is typical in RF-based low range communications, it opens the door to low-cost and low-power implementations of BANs or personal area networks (PANs). Hence, the human body is exploited as a communication channel, so that communication can take place with much lower power consumption than in standard radio systems commonly used for BANs (e.g. ZigBee or Bluetooth systems). Since BCC is usually applied in close proximity to the body, it can be used to realize new and intuitive body-device interfaces based on contact or proximity. This creates possibilities for many applications in the field of identification and security.

BCC can be technically realized by electric fields that are generated by a small body-worn tag, e.g., being integrated to a credit card or another suitable device attached to or worn in close proximity to the body. This tag capacitively or galvanically couples a low-power signal to the body. Sometimes this body-coupled communication is referred to as "near-field intra-body communication". BCC is a wireless technology that allows electronic devices on and near the human body to exchange digital information through capacitive or galvanic coupling via the human body itself. Information is transmitted by modulating electric fields and either capacitively or galvanically coupling tiny currents onto the body. The body conducts the tiny signal to body mounted receivers. The environment (the air and/or earth ground) provides a return path for the transmitted signal.

FIG. 1 shows an exemplary body communication system structure, where data signals are transmitted via couplers placed near or on the body. These couplers transfer the data signal, either galvanically or capacitively, to the body. In the example of FIG. 1, one coupler or electrode provides ground potential GND and the other coupler or electrode is used for transmitting/receiving a signal S. More specifically, transmission from a transmitter (TX) 100 to a receiver (RX) 200 over a human arm is depicted. Generally, every node can in principle act both as transmitter and receiver, i.e., as a transceiver (TRX), and communication can take place from everywhere on the body.

This capacitive nature of body coupled communication systems make is different from conventional radio communication systems. In the latter systems, the antenna has a real-value resistive impedance of 50, 75 ohms or similar, instead of the very high-ohmic capacitive load of the couplers used in body coupled communication. Solutions that improve communication specifically for BCC have been sought for example in the paper "An Energy-Efficient Body Channel Communication based on Maxwell's Equations Analysis of On-Body Transmission Mechanism", by Joonsung Bae et al., which discloses a transceiver architecture. The transceiver architecture places an inductor in series with a capacitive coupler.

SUMMARY OF THE INVENTION

A body coupled communication device is provided. The body coupled communication device is arranged to receive signals via a body transmission channel. The body coupled communication device comprises two couplers, a receiver amplifier, and an inductance.

The two couplers are arranged to receive a body-coupled signal from the body transmission channel, the body transmission channel being formed by a body of a user when the body is in the direct vicinity of the couplers.

An input of the receiver amplifier is coupled to a first one of the two couplers. The inductance is for matching the impedance of the receiver amplifier, the inductance being arranged in parallel to the couplers. The receiver amplifier may comprise a differential input stage; in this case the two inputs of the differential input stage may be coupled to the two couplers. If the input stage of the receiver transmitter is not differential, a second one of the two couplers maybe coupled to ground.

The capacitive impedance is of the couplers is relatively large. A matching inductor is placed in parallel with transducer to mitigate attenuation caused by capacitance between the couplers. Having an inductor in series with the capacitive transducer, as is done in the paper cited in the background, would compensate the capacitive nature of the propagation path. However, by placing an inductor in parallel to the receiver, the capacitance between the two couplers at the receiver is compensated. The matching L then enhances the receiver sensitivity.

In an embodiment, the body coupled communication device is arranged to receive and transmit signals via the body transmission channel. The two couplers are used both to receive and to transmit a body-coupled signal over the body transmission channel. The device comprises a transmitter amplifier, different from the receiver amplifier. The transmitter amplifier is coupled to a first coupler of the two couplers. The inductance is coupled between the transmitter amplifier and the first coupler.

In this location, the inductor is parallel to the receiver amplifier, but in series with the transmitter amplifier. This means that the inductor is suitable to match inductance with respect to the high impedance of a receiver amplifier, and with respect to the low output impedance of a transmitter amplifier. In this solution no duplex-switch is needed.

Accordingly, a circuit is provided to connect a transmitter and a receiver to the same transducer, which offers matching of the transmitter's low output impedance, matching of the receiver's high input impedance and avoids the need for a duplex switch that disconnects the transmitter when receiving.

In an embodiment, the inductor is chosen so that the pass-band formed by the resonance filter formed by the inductor and capacitance includes the carrier frequency. In particular, the inductance may be chosen by solving an LC-filter equation, e.g., $2\pi f = 1/\sqrt{LC}$, for L. Herein, is L the inductor value, C the capacitance of the coupler, f the carrier frequency.

The body-coupled communication device may be applied in a variety of applications. For example, doctors and medical staff may wear a bcc-device that identifies them to medical equipment as soon as they touch the medical equipment. Patients may wear a BCC device for monitoring using one or more bio-sensors, e.g., temperature, heart rate etc; using BCC the data may be uploaded to a smart phone or other equipment.

BCC may also be applied, for financial transactions, public transport, access control, body area networks, and for media streaming to or from a smart phone.

BRIEF DESCRIPTION OF THE DRAWINGS

These and other aspects of the invention are apparent from and will be elucidated with reference to the embodiments described hereinafter. In the drawings.

Figure 1:
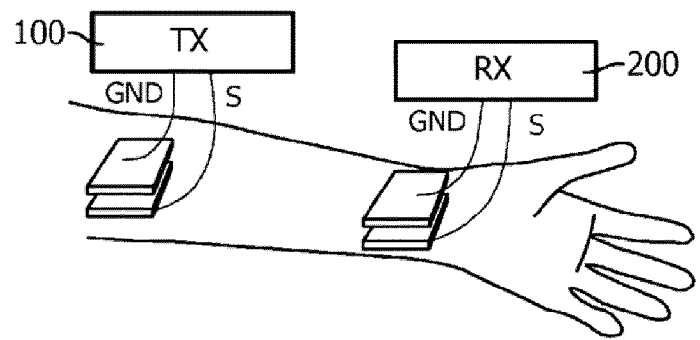
FIG. 1 shows a schematic electrode arrangement of a BCC system.

Items which have the same reference numbers in different figures, have the same structural features and the same functions, or are the same signals. Where the function and/or structure of such an item has been explained, there is no necessity for repeated explanation thereof in the detailed description.

LIST OF REFERENCE NUMERALS 100, 200, a body coupled communication device
201, 400, 500
150 a body of a user
190 a body coupled communication system
202, 204 couplers
206 a receiver amplifier
209 a transmitter amplifier
210 an amplified received signal
220 an inductance
260 a body transmission channel
410 a transmitter amplifier
510 a first controllable switch
511 a first output
520 a second controllable switch
521 a second output
530 a reference voltage

DETAILED DESCRIPTION OF EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

FIG. 1 shows a schematic electrode arrangement of a BCC system, as discussed above. The plates may be orientated parallel to each other and to the skin of the body where the plates are applied; this arrangement is shown in the figure. This arrangement is not necessary; the plates may also be arranged parallel to the skin, but side by side, both plates being in the direct vicinity of the skin. Note that in FIG. 1, one of the plates is labeled 'GND' for ground. Although this is an option, this is not necessary.

In BCC the signals are transmitted via couplers, which are placed near or on the body. These couplers transfer the data signal, either galvanically or capacitively, to the body. The transfer characteristic of the body channel is optimal for frequencies from about 100 kHz up to about 100 MHz. Frequencies below 100 kHz are affected from significant electrostatic interference in the body channel. At frequencies above 100 MHz the wavelength, i.e. <3 m, comes in the range of the length of (parts of) the human body, and the human body starts to act as an antenna; as a consequence, it is possible that the BCC nodes located on different bodies can communicate which each other using the "human body antenna". For even higher frequencies, even the couplers start acting as antennas. Hence, communications can also take place when the (human) body is not present as communication medium. Both effects are unwanted, since only devices placed on or near the same (human) body are supposed to communicate.

Figure 2A:
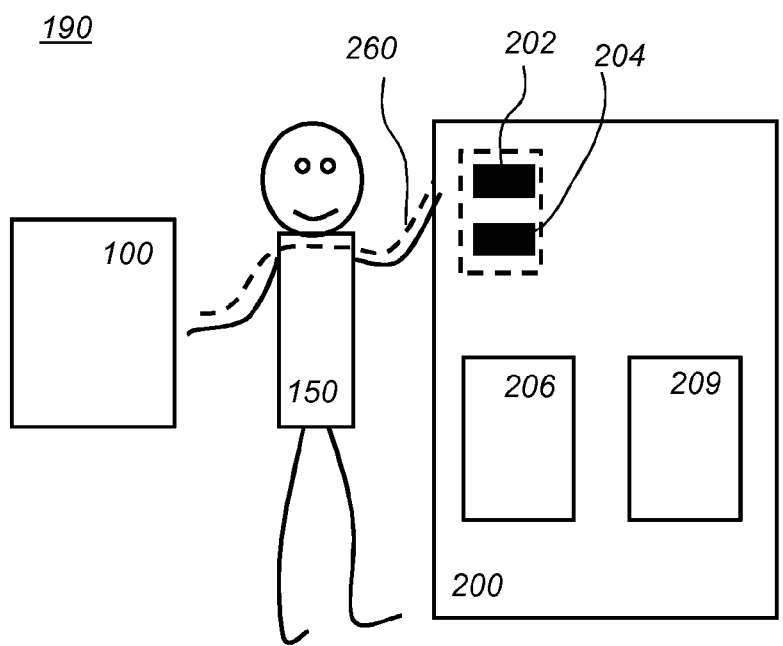
FIG. 2a shows a body coupled communication system 190.

FIG. 2a discloses a body coupled communication system 190, in which the invention may be applied. FIG. 2a schematically shows an embodiment of a body coupled communication system 190 comprising a first body coupled communication device 100 and a second body coupled communication device 200. The first body coupled communication device 100 and the second body coupled communication device 200 are configured to communicate signals and data via a body transmission channel 260 which is formed by the body of a user 150. The first body coupled communication device 100 and the second body coupled communication device 200 are able to communicate via the body transmission channel when couplers of the respective devices is in the direct vicinity of the body of the user. Direct vicinity of the body of the user means that the couplers and the body are within a maximum distance of each other to allow the exchange of signals via the body of the user. Optionally, the maximum distance (of the direct vicinity) is closer than 10 cm, or closer than 5 cm. Optionally, the maximum distance is closer than 2 cm. In an optional embodiment of the invention, direct vicinity means that the user touches the respective couplers of the first body coupled communication device 100 and a second body coupled communication device 200. It is to be noted that the communication is only possible when both devices are simultaneously in the direct vicinity of the body of the user.

The first body coupled communication device 100 is capable of receiving signals, data, and information via the body transmission channel 260. For example, device 100 may comprise couplers 202 and 204 for receiving signals from the body transmission channel when the body is in the direct vicinity of the couplers. In an embodiment, the couplers comprise two plates which form two poles of the couplers. The plates are electrically conductive, e.g., made of metal. The first body coupled communication device 100 further comprises a receiver amplifier 206 which is coupled to the couplers and further comprises a transmitter amplifier 209 which is also coupled to the couplers. Embodiments of the connection between receiver amplifier 206, a transmitter amplifier 209, and couplers 202 and 204 are shown herein.

The receiver amplifier is a so-called 'low noise amplifier' (LNA). A Low-noise amplifier (LNA) is an electronic amplifier used to amplify the signals captured by the couplers. The transmitter amplifier is a so-called 'power amplifier'. The low noise amplifier typically has lower power output and lower noise coefficient than the power amplifier. The LNA is the first gain stage in the receiver path.

For example, the normal data communication from the first body coupled communication device 100 to the second body coupled communication device 200 may be performed at, for example, a single carrier frequency of 10 MHz, or, for example, at a plurality of carrier frequencies in the range from 1 MHz to 50 MHz.

An exemplary embodiment of a receiver amplifier may be found in document WO2010/049842.

Figure 2B:
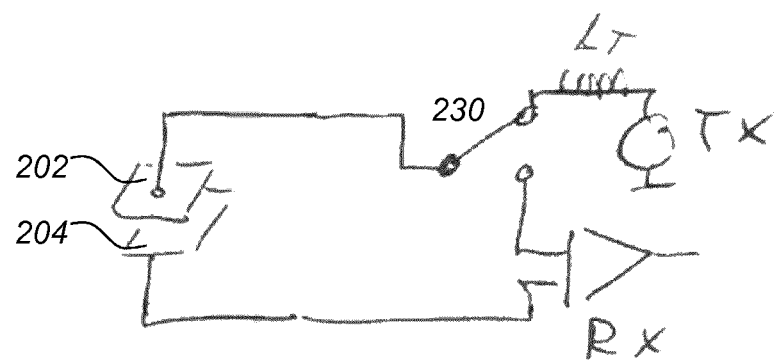
FIG. 2b shows a body coupled communication device with a duplex switch, FIG. 3 schematically shows an embodiment of a body coupled communication device 201, FIG. 4 schematically shows an embodiment of a body coupled communication device 400, FIG. 5 schematically shows an embodiment of a body coupled communication device 500.

FIG. 2b schematically shows one way of connecting a receiver amplifier (RX), a transmitter amplifier (TX), and couplers 202 and 204, which is not according to the invention. The device comprises a duplex switch 230 which selectively connects either the receiver amplifier (RX) or the transmitter amplifier (TX) to the couplers. Although the device may comprise a coil (LT), it is not arranged in parallel to the couplers.

Such a duplex switch was previously considered necessary because of the low output impedance of the transmitter and the high input impedance of a receiver. If both receiver and transmitter were directly connected to the couplers, the receiver would not see a signal; the transmitter forces a fixed voltage (which may even be 0) so that each received signal is too weak and short-circuited. A duplex switch enables two-way communication and avoids the negative impact of the transmitter on the reception of weak signals.

Below circuits are shown that avoid the need of a duplex switch.

Figure 3:

FIG. 3 schematically shows an embodiment of a body coupled communication device 201.

Body coupled communication device 201 comprises
 couplers 202 and 204. The couplers are arranged to receive a body-coupled signal from the body transmission channel 260. Couplers 202 and 204 will also be referred to the transducer.
Body coupled communication device 201 comprises
a receiver amplifier 206 coupled to at least one of the two couplers, and an inductance 220 for matching the impedance of the receiver amplifier, the inductance being arranged in parallel to the couplers.

In Body-Coupled Communication, a signal propagates as an E-Field transmitted from a capacitive transducer and it is received via capacitive transducer. Such transducer behaves electrically as a small capacitor, often much smaller than a pF. The capacitive impedance is of the couplers is relatively large. A matching inductor is placed in parallel with the couplers to mitigate attenuation caused by capacitance between the plates when it receives a signal.

As shown in FIG. 3, the receiver amplifier 206 comprises a differential input stage, two inputs of the differential input stage being coupled to the two couplers. This not necessary, for example, a minus-input of the receiver amplifier may be grounded to the device. Thus a single-input amplifier may be applied in the body coupled device.

Returning to the body coupled device shown in FIG. 3:

The first coupler 202 is connected to a first end of inductance 220; the second coupler 204 is connected to a second end of inductance 220. The first end of inductance 220 is connected to a first input of differential receiver amplifier 206; the second end of inductance 220 is connected to a second input of differential receiver amplifier 206. Inductance 220 is thus connected in parallel to the two inputs of differential receiver amplifier 206.

Receiver amplifier produces an amplified received signal 210. Signal 210 may be an input to a further circuit; say a demodulator.

In FIG. 3, an inductor is located in parallel with the transducer to mitigate attenuation caused by capacitance between the plates of the transducer, whereas in Joonsung Bae et al., an inductor is placed in series with the transducer to mitigate the capacitive nature of propagation between the transmitter and the receiver. The solution according to FIG. 3 is better because the capacitance of the plates (Cp) is a relatively small capacitance, it pulls down the voltage at the input of the receiver amplifier, this can be compensated by inductor 220 in parallel to Cp.

Inductance 220 may be implemented as a coil.

Figure 4:
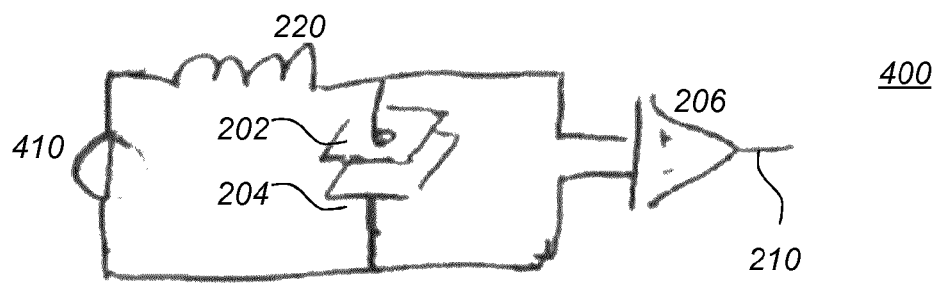

FIG. 4 schematically shows an embodiment of a body coupled communication device 400.

In addition to the components of device 201, device 400 comprises a transmitter amplifier 410. Inductance 220 and transmitter amplifier 410 are together parallel to couplers 202 and 204.

Transmitter amplifier 410 is coupled to first coupler 202. Inductance 220 is coupled between the transmitter amplifier 410 and the first coupler 202 of the two couplers. In this way, inductance 220 improves matching both for transmission as for receiving.

In the embodiment as shown in FIG. 4, transmitter amplifier 410 comprises a differential output stage having two outputs. Inductance 220 is coupled between a first output of the differential output stage and first coupler 202 of the two couplers. Second coupler 204 of the two couplers is coupled to the second output of the differential output stage.

In more detail this may be achieved as follows: First coupler 202 is connected to a first input of differential amplifier 206 and to a first end of inductor 220. A second end of inductor 220 is connected to a first output of transmitter amplifier 410. A second output of transmitter amplifier 410 is connected to second coupler 204. Second coupler 204 is further connected to the second input of receiver amplifier 206. Transmitter amplifier 410 acts as a voltage source.

With respect to the receiving amplifier 206 the inductor 220 is arranged in parallel, whereas with respect to the transmitting amplifier 410, inductor 220 is arranged in series. Accordingly, low output impedance is matched during transmission and a high input impedance is matched during receiving.

The inductor acts as a parallel impedance in the receive path. During reception, the inductor acts as a resonating parallel matching impedance that enhances the received signal. This effect works well with a high impedance LNA input.

The inductor acts as a series impedance for the transmit path. For a transmit power amplifier with an output voltage Vout, the series connection of an inductor and transducer capacitance form a very low joint impedance. Hence the transmitter can deliver a large amount of power. The voltage on the capacitive plate is amplified by the inductor+capacitor.

The transmitter and receiver amplifier are coupled to the same couplers, without the need for a duplex switch that disconnects the transmitter when receiving. The inductor may be implemented as a coil.

Note that couplers 202 and 204 are used both for transmitting and receiving. Interestingly, inductor 220 is beneficial both during transmitting and during receiving. Thus an Impedance-Matched Duplex Front End is obtained for Body Coupled Communications.

It is interesting to compare the solution explained with respect to FIG. 4 with alternative ways to achieve duplex communication. For example, duplex communication may be achieved using separate transmission and receiving couplers. The solution of FIG. 4 is better as it needs on a single set of couplers, say plates. For example, duplex communication may be achieved using a so-called duplex switch, i.e., a switch that either connects the couplers to the transmitter or to the receiver amplifier. The solution of FIG. 4 does not require a duplex switch.

The dual effect of inductance 220 is better if the inductance of transmitter amplifier 410 is low, when the transmitter amplifier is not transmitting. This will generally be the case for power transmitters that are used for transmitter amplifier 410. In an embodiment, the input impedance of the receiver amplifier is higher than the output impedance of the transmitter amplifier, even when the transmitter amplifier is not transmitting. In the latter embodiment, the ratio between the input impedance of the receiver amplifier and the output impedance of the transmitter amplifier is less than 1; in a further embodiment, the ratio is less than 0.5, or even less than 0.1.

Figure 5:
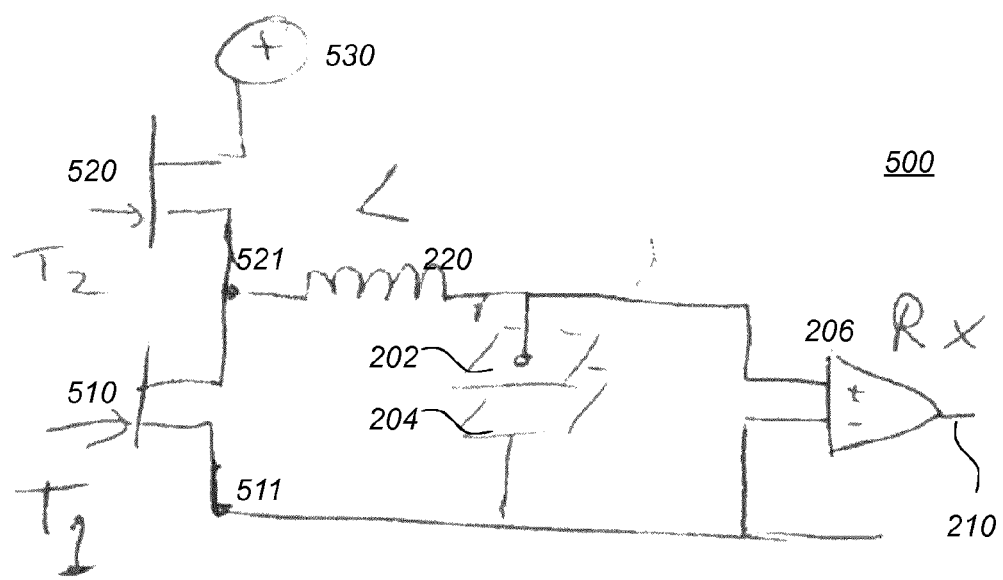

FIG. 5 schematically shows an embodiment of a body coupled communication device 500. Device 500 is the same as device 400 except that a suitable output stage of the transmitter amplifier has been shown. The shown design is an example of a transmitter amplifier that has a low impedance when it is not transmitting.

The output stage of the transmitter amplifier comprises a first controllable switch 510, T1 and a second controllable switch 520, T2. The first and second controllable switches are controllable between, at least, a conducting state and a non-conducting state.

Second controllable switch 520, T2 is arranged to couple the inductance 220 to a reference voltage 530 when the second controllable switch 520, T2 is conducting. The second controllable switch 510, T1 is arranged to couple the second output 521 of the output stage to the first output 511 of the output stage, when the first controllable switch 510 is in the conducting state.

The first 510 and second 520 controllable switches may be transistors. The reference voltage may be a positive voltage, say, obtained from a battery.

The output stage of the transmitter amplifier comprises two transistors, which pull the output voltage to either a positive voltage 530 or to a reference low voltage, say, zero voltage or device ground. When device 500 is in receiving mode, the controllable switch 510, T1 is set into conduction, while 520, T2 is not conducting: the impedance 220, L then acts as a parallel capacitance that enhances the receiver sensitivity. Moreover, the output impedance is very low if switch 510 is conducting. The output stage may be a so-called push-pull output stage.

In a more detailed embodiment, the transmitter amplifier may comprise a differential output stage, the differential output stage comprising a second transistor 520, connected to a reference voltage 530, and a first transistor 510. Where the two transistors are connected to each other a second output 521 of the transistor amplifier is defined. At the other side of transistor 510 (not the base side) the first output 511 is defined. The first transistor 510 is connected to second coupler 204. The bases of transistors 520 and 510 are connected to further elements of the transmitter amplifier. If the transistors 520 and 510 are complementary or quasi-complementary devices then it is possible to connect the bases of transistors 510 and 520 to each other. The second output 521 is connected to inductance 220.

With respect to the embodiments discussed with reference to FIGS. 3-5, a good choice for the inductance can further improve the reception and transmission. For example, the body coupled signal may be a modulated carrier signal. The inductance may be further optimized by choosing its value so that the carrier frequency lies in the pass-band of the LC-filter formed by the inductance (L) and the couplers (C). This means that L is chosen so that L and C are in resonance.

To determine a good value for the inductance L, we may use the formula $2\pi f = 1/\sqrt{LC}$, in which f is the carrier frequency, say 8 Mhz.

the capacitance of the plates is $C = \in A/d$;

the dielectrical constant $\in = 8.85 \cdot 10^{-12}$ F/m

A is the size of the coupler plates, say, 2 by 3 centimeters d is the distance between the plates say 5 mm For the exemplifying value given above, we obtain that coil L=0.37 milli Henry (mH)

A body-coupled communication device may contain additional components then are shown above. For example, a body coupled device may comprise a wakeup circuit, one or more sensors, say bio-sensors, say a heart rate sensors. Typically, the device comprises a microprocessor (not shown) which executes appropriate software stored at the device. The device may, in whole or in part, be implemented in programmable logic, e.g., as field-programmable gate array (FPGA). The devices may be implemented, in whole or in part, as a so-called application-specific integrated circuit (ASIC), i.e. an integrated circuit (IC) customized for their particular use.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A body coupled communication device configured to receive and transmit a body-coupled signal via a body transmission channel, the device comprising:
   a first coupler and a second coupler configured to receive and transmit the body-coupled signal via the body transmission channel, the body transmission channel being formed by a body of a user when the body is in a direct vicinity of the first and second couplers;
   a receiver amplifier coupled to the first coupler;
   a transmitter amplifier coupled to the second coupler; and
   an inductor for matching an impedance of the receiver amplifier, wherein the inductor is arranged in parallel to the first and second couplers and between the transmitter amplifier and the first coupler, such that the inductor is in parallel to the receiver amplifier and in series with the transmitter amplifier.

2. The body coupled communication device as in claim 1, wherein the receiver amplifier comprises a differential input stage, wherein two inputs of the differential input stage are coupled to the first and second couplers.

3. The body coupled communication device as in claim 1, wherein the transmitter amplifier comprises a differential output stage having a first output and a second output, wherein the inductor is coupled between the first output of the differential output stage and the first coupler, and the second coupler is coupled to the second output of the differential output stage.

4. The body coupled communication device as in claim 1, wherein an input impedance of the receiver amplifier is higher than an output impedance of the transmitter amplifier, even when the transmitter amplifier is not transmitting.

5. The body coupled communication device as in claim 3, wherein the differential output stage of the transmitter amplifier comprises a first controllable switch and a second controllable switch, the first and second controllable switches being controllable between a conducting state and a non-conducting state, wherein
   the second controllable switch is configured to couple the inductor to a reference voltage when the second controllable switch is conducting, and
   the first controllable switch is configured to couple the first output of the differential output stage to the second output of the differential output stage, when the first controllable switch is in the conducting state.

6. The body coupled communication device as in claim 5, wherein the first and second controllable switches are transistors.

7. The body coupled communication device as in claim 1, wherein the body coupled signal is a modulated carrier signal having a frequency in a pass-band of an LC-filter formed by the inductor and the first and second couplers.

* * * * *